(12) United States Patent
Salvi dos Reis et al.

(10) Patent No.: US 12,066,140 B2
(45) Date of Patent: Aug. 20, 2024

(54) CASING SYSTEM FOR INTEGRATION OF MODULAR INTERNAL INTERVENTION EQUIPMENT IN TUBULAR LINES

(71) Applicants: PETROLEO BRASILEIRO S.A.—PETROBRAS, Rio de Janeiro (BR); SERVICO NACIONAL DE APRENDIZAGEM INDUSTRIAL—DEPARTAMENTO REGIONAL DE SANTA CATARINA-SENAI/SC, Florianopolis (BR)

(72) Inventors: Ney Robinson Salvi dos Reis, Rio de Janeiro (BR); Igor Mendes Ursine Krettli, Rio de Janeiro (BR); Hugo Francisco Lisboa Santos, Rio de Janeiro (BR); Eduardo Gerhardt, Porto Alegre (BR); Cristiane Mioto Becker, Porto Alegre (BR); Antonio Droescher Sandri, Porto Alegre (BR); Andre Viegas Wentz, Porto Alegre (BR)

(73) Assignees: PETROLEO BRASILEIRO S.A.—PETROBRAS, Rio de Janeiro (BR); SERVICO NACIONAL DE APRENDIZAGEM INDUSTRIAL—DEPARTAMENTO REGIONAL DE SANTA CATARINA-SENA/SC, Florianopolis (BR)

( * ) Notice: Subject to any disclaimer, the term of this patent is extended or adjusted under 35 U.S.C. 154(b) by 755 days.

(21) Appl. No.: 17/263,204

(22) PCT Filed: Jul. 30, 2019

(86) PCT No.: PCT/BR2019/050306
§ 371 (c)(1),
(2) Date: Aug. 9, 2021

(87) PCT Pub. No.: WO2020/024030
PCT Pub. Date: Feb. 6, 2020

(65) Prior Publication Data
US 2021/0372556 A1 Dec. 2, 2021

(30) Foreign Application Priority Data

Aug. 2, 2018 (BR) .......................... 102018015804-0

(51) Int. Cl.
*F16L 55/28* (2006.01)
*B61B 13/10* (2006.01)
*F16L 101/30* (2006.01)

(52) U.S. Cl.
CPC .............. *F16L 55/28* (2013.01); *B61B 13/10* (2013.01); *F16L 2101/30* (2013.01)

(58) Field of Classification Search
None
See application file for complete search history.

(56) References Cited

U.S. PATENT DOCUMENTS

| 4,601,204 A * | 7/1986 | Fournot .................. B08B 9/049 73/866.5 |
| 6,450,104 B1 | 9/2002 | Grant |

(Continued)

*Primary Examiner* — Kristina M Deherrera
*Assistant Examiner* — Mark A Shabman
(74) *Attorney, Agent, or Firm* — RAPHAEL BELLUM PLLC

(57) ABSTRACT

The present invention provides a casing system for integration of modular internal intervention equipment in tubular lines, wherein the equipment comprises a plurality of modules (2), the casing system comprising a sleeve (1) encasing, in an integral manner, at least one module (2) of the plurality of modules (2) and at least one portion of at least one component upstream (3, 2) or downstream (2, 2a) of said at least one module (2). The integration casing system of the (Continued)

present invention guarantees the mechanical integration of all the modular internal intervention equipment, rendering viable the operation thereof inside tubular lines in a safer, more efficient and more advantageous manner.

13 Claims, 3 Drawing Sheets

(56) References Cited

U.S. PATENT DOCUMENTS

| | | | | |
|---|---|---|---|---|
| 7,954,575 | B1 * | 6/2011 | Bloxsom | H02G 1/088 |
| | | | | 180/9.1 |
| 8,256,270 | B2 * | 9/2012 | Fielding | G01M 3/2823 |
| | | | | 73/49.1 |
| 8,571,711 | B2 * | 10/2013 | Jacobsen | B62D 63/00 |
| | | | | 180/9.26 |
| 2002/0190682 | A1 * | 12/2002 | Schempf | G01N 29/265 |
| | | | | 318/568.11 |
| 2003/0150351 | A1 | 8/2003 | Salvi Dos Reis | |
| 2004/0099175 | A1 * | 5/2004 | Perrot | F16L 55/28 |
| | | | | 104/138.1 |
| 2004/0221647 | A1 * | 11/2004 | Sabatino | G01F 23/242 |
| | | | | 361/749 |
| 2005/0085693 | A1 * | 4/2005 | Belson | A61B 1/0053 |
| | | | | 600/114 |
| 2013/0019684 | A1 * | 1/2013 | Krywyj | F16L 55/46 |
| | | | | 73/592 |
| 2015/0210846 | A1 * | 7/2015 | Qi | H01B 3/40 |
| | | | | 523/427 |
| 2016/0354814 | A1 * | 12/2016 | Carson | B08B 9/0436 |
| 2018/0056897 | A1 * | 3/2018 | Shimizu | H01B 7/183 |

* cited by examiner

CASING SYSTEM FOR INTEGRATION OF MODULAR INTERNAL INTERVENTION EQUIPMENT IN TUBULAR LINES

FIELD OF INVENTION

The present invention is related to equipment used in internal intervention in tubular lines. More specifically, the present invention is related to a casing system used to integrate modular internal intervention equipment in tubular lines.

BACKGROUND OF THE INVENTION

Tubular lines may be used in various industrial facilities, such as water and gas distribution lines, hydraulic, thermal or nuclear electricity generation plants, and refineries, among others.

Throughout the entire production system of oil and its by-products, tubular lines, like flexible pipes, may also be used for drainage, disposal, and injection of fluids.

The internal inspection of tubular lines is a fundamental requirement for guaranteeing the operating process, given the importance of the lines in transporting substances and materials. These means of drainage require constant inspection and preventive and corrective maintenance, and the use of internal intervention equipment suitable for each practice is necessary.

One of the strategies for internal intervention in tubular lines is use of PIGs (Pipeline Inspection Gauges), which is equipment that is placed inside pipes in order to unblock, clean, drain or inspect them. This technology uses the energy of the line's working fluid for passive movement using the propulsion from the fluid's pressure.

There are some situations that hinder or even prevent internal intervention in tubular lines using PIGs. Notably among these situations are the physical conditions and characteristics of the tubular line, such as partial/total obstruction; different diameters along the line; extreme curves and slopes; different surface configurations of the pipe's internal wall; and interruption of the flow of the working fluid in the line.

In these adverse situations, one strategy that may be employed is the use of internal intervention equipment that has its own propulsion, such as robotic systems, also described here as a robot. There are different ways to use a robot inside tubular lines. One of the main ways is the use of a robot comprised of interconnected modules, such as in the form of a train, which can be moved inside tubular lines that have varying configurations.

The modules that comprise a robot are generally made of metal material, and contain electric, electronic or mechanical parts, depending on the application for which the module is intended. Each of the robot's modules may be able to perform one or more functions of intervention tools on tubular lines, such as a tool for inspection, unblocking, cleaning, electrical resistance for heating, claws for collecting objects, and injecting chemical products, among others.

Among a robot's modules, one or more may be the traction module or the tractor module, which is responsible for moving the system as a whole along a tubular line.

A robot, depending on the application, may operate autonomously and be controlled remotely, without the need for an umbilical cable with the control station. In other cases, it is necessary for an umbilical cable to be connected to the robot in order to power it electro-hydraulically, for communication, and remote control by the control station.

A robot's modules are usually interconnected mechanically using mechanical or flexible labeled connections, and even cables. The mechanical connections between the robot's modules allow transmission of traction from the tractor module to the modules, moving them along a tubular line, which may present various configurations in diameter and curvature.

Various configurations of existing mechanical connections between the robot's modules are known in the state of the art. In general, these connections are characterized by flexible couplings, such as universal joints, cross joints, flexible axes, pivots or cables. Mechanical connections, such as those mentioned, allow angular pivoting of the modules along the curves during movement inside a tubular line.

Additionally, there may be a communication element between the robot's modules, such as a cable or set of cables that may provide electrical power, control, and communication, among other resources.

The umbilical cable and the robot are usually interconnected through a mechanical coupling interface, with a mesh of wires wrapped around the umbilical cable—known as a "Chinese finger trap"—which is attached by screws to the structure of the module on the downstream end of the robot.

One of the main requirements for designing modular equipment for internal intervention in tubular lines, such as a robot, is the force of the traction motor. Intervention equipment engines should be designed to enable movement of the intervention equipment as a whole through a tubular line. The engine should be capable of generating sufficient tractive force to move the entire load from the equipment's components over vast distances, such as the umbilical cable, modules, and their respective mechanical interconnections.

Various additional factors are considered in designing modular intervention equipment for the inside of tubular lines, such as the material of which the equipment's components are manufactured, the pulling force caused by the umbilical cable, the friction of the equipment's components and of the umbilical cable with the tubular line, and the working fluid of the line, among others.

During the robot's path of movement inside a tubular line, the tractive force generated by the engine of the robot's tractor module is transferred to the umbilical cable, and also to the cable(s) that interconnect(s) the modules through the structure of the modules themselves, the mechanical connections between modules, and the mechanical connection interface between the umbilical cable and a module, allowing the robot to move as a whole.

In this way the robot's modules and their interconnecting mechanical connections should be designed (manufacturing material and structural sizing) to withstand the different types of tensions arising from the tractive force generated by the engine of the tractor module. In relation to the materials that may be used in the modules and their mechanical connections, there are stainless steel alloys (material with high mechanical resistance) and aluminum alloys (reduced-weight material). As a consequence of this design factor, there is an increase in the material used to manufacture the structure of the module, causing increased weight and decreased useful internal space of the module.

Similarly, the mechanical interconnection connections between modules, and the cabling between the modules and the umbilical cable, are also subject to the effects of axial and radial loads, which may cause them to rupture. That condition, for example, impacts costs and availability of the system, because it is necessary to increase the number of preventive or corrective inspections and maintenance to try to mitigate or resolve possible ruptures, which may cause total stoppage of the production system.

Additionally, the umbilical cable and the modules are subject to the effects caused by friction from contact with the internal wall of the tubular line, as well as friction with its working fluid, causing difficulties in moving the robot. The difficulty in relation to the line's working fluid may be caused by the characteristics of pressure differences and the viscosity of each fluid, wherein the system should be able to overcome greater differences in pressure and/or higher viscosities. In relation to the tubular line itself, direct contact with the internal wall occurs, which might be rough, or there may be obstructions along the line. Note that direct physical contact of the components of the modular internal intervention equipment with the tubular line may also cause wear and tear due to abrasiveness.

It can also be stated that the modular internal intervention equipment as a whole is exposed and interacts directly with various types of fluids, which may have corrosive characteristics or properties that are damaging to their components. Therefore, the efforts to design modular internal intervention equipment for tubular lines should also be focused on creating equipment that is resistant to classified and highly corrosive environments.

In order to enable operations performed by modular intervention equipment inside of tubular lines in a more efficient and advantageous manner, combining gains obtained improved performance in moving the modular internal intervention equipment along the tubular line, avoiding encumbrance of its components, such as the modules that comprise it, the mechanical interconnections, the cabling connection between modules and the umbilical cable, it is necessary to supply the mechanical interconnections and the subsequent use of a system that results in improvements in relation to the friction and the tractive load inherent to the process of moving modular internal intervention equipment in a tubular line.

Some documents in the state of the art are focused on the problems discussed above, which documents will be presented below.

Document U.S. Pat. No. 6,450,104 B1 describes a modular robot configured to move in confined spaces, such as pipes with different configurations. The modules are interconnected by flexible couplings made of plastic material in the form of a pipe, and linear actuator-type tractive transfer devices, which are connected to the shafts that have pressure plates on their ends, which allow adherence to the internal wall of the pipe. The modules also have buffers that maintain alignment and allow angular movement of the robot.

Document U.S. Pat. No. 6,672,222 B2 describes a robot comprised of two modules that are interconnected by means of a flexible or rotating joint, which connects the axis of the hydraulic piston system to each module. The umbilical is connected to the rear module by a coupling interface. The document, in turn, proposes a layer applied to the joint that consists of a helical spring wrapped by a protective element made of material with mechanical, thermal and chemical properties that are favorable to the cyclical changes between the two modules, capable of keeping them aligned, and serving as protection for the joint and the hydraulic pipes that power the two modules.

However, it is seen that all equipment for internal intervention in tubular lines in the state of the art described herein present mechanical connections between the modules, and a mechanical interface between a module and the umbilical cable. It is also seen that there is no system for encasing the internal intervention equipment in tubular lines.

As will be better detailed below, the present invention seeks to resolve the problems in the state of the art described above in a practical, efficient and advantageous manner.

SUMMARY OF THE INVENTION

The purpose of the present invention is to provide a casing system used for integration of modular internal intervention equipment in tubular lines, eliminating the need to use mechanical connections and interfaces, allowing movement in tubular lines that have varying diameters and curvatures, protecting against wear and tear due to friction and abrasion, and absorbing tractive forces.

In order to attain the objective described above, the present system provides a casing system for integration of modular internal intervention equipment in tubular lines, wherein the equipment comprises a plurality of modules, the casing system comprising a sleeve that encases, in an integrated manner, at least one module of the plurality of modules and at least one portion of at least one component that is upstream or downstream of the said at least one module.

BRIEF DESCRIPTION OF THE FIGURES

The detailed description presented in the following section references the annexed figures and their respective reference numbers.

DETAILED DESCRIPTION OF THE INVENTION

First, it is noted that the following description will begin with preferred configurations and embodiments of the invention. As will be evident to anyone skilled in the matter, however, the invention is not limited to these configurations and specific embodiments.

Figure 1:
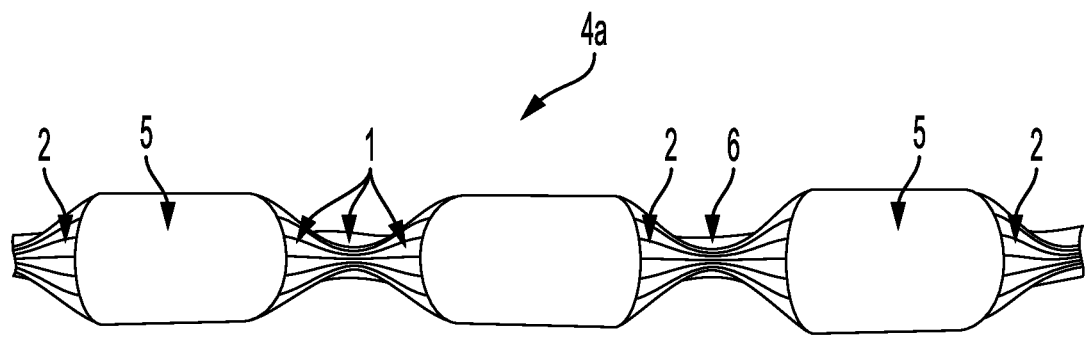
FIG. 1 illustrates a section of the casing system for integration applied to modular internal intervention equipment in tubular lines, according to a preferred embodiment of the present invention.

FIG. 1 shows a section of a preferred embodiment of a casing system for integration 4a of modular internal intervention equipment in tubular lines of the present invention. The modular internal intervention equipment in tubular lines comprises a plurality of modules 2 and at least one communication element 6 connected between two modules 2 of the plurality of modules 2. The casing system for integration 4a of FIG. 2 comprises a sleeve 1 that encases, in an integrated manner, at least one module 2 and at least one portion of at least one component that is upstream or downstream of the said at least one module 2. The upstream component is an umbilical cable 3 or a module 2, and the downstream component is a module 2 or a tractor module 2a, as will be further detailed in the description of FIG. 3.

The system 4a of FIG. 1 further comprises at least one attachment element 5 applied to the external surface of the sleeve 1, in the position where each one of the modules 2 is located. The casing system for integration 4a provides the mechanical integration of the modules 2 through the sleeve 1 that encases, in an integrated manner, the modules 2 and their respective communication elements 6. Thus the use of conventional mechanical connections is provided between the modules 2, such as, for example, universal joints, cross joints, flexible axes, labels or cables.

In addition, the attachment element 5 of the casing system for integration of this present invention guarantees the positioning and attachment of the modules 2 inside the sleeve 1, preventing relative movement between the modules 2, and between the modules and the sleeve 1. This last condition could cause an increased load on the communication elements 6, which are located between the modules 2. The attachment element 5 may be made of a thermo contractile, elastomeric, or thermoplastic type of material.

It is important to note that at least one of the modules 2, depending on its application, may not need to communicate with the other module(s), a communication element 6 not being used.

Figure 2:
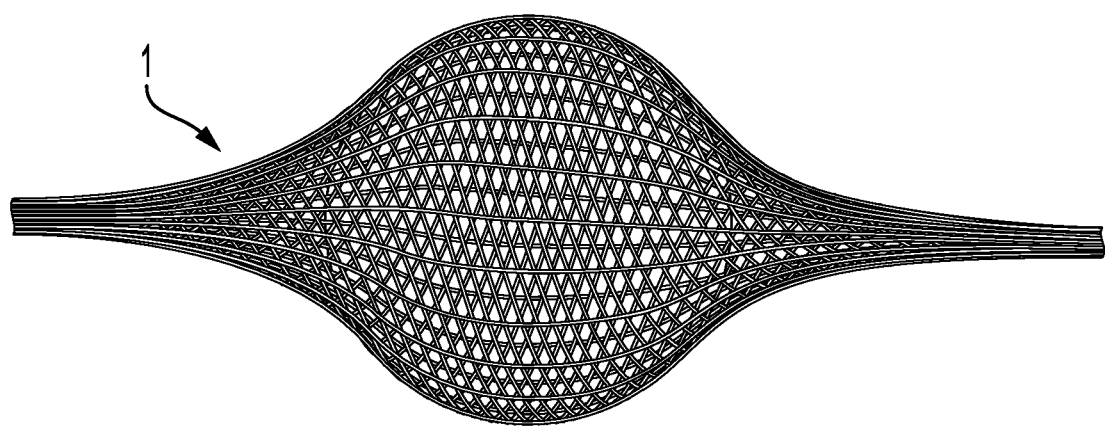
FIG. 2 illustrates an enlarged view of the sleeve of the casing system for integration, in accordance with a preferred embodiment of the present invention.

FIG. 2 illustrates an enlarged view of the sleeve configuration 1 of the casing system for integration of the present invention.

As can also be seen in FIG. 2, the sleeve 1 is in the form of a single mesh, that may be a single mesh designed of wires or fibers. Preferably, the material used to manufacture the mesh that constitutes the sleeve 1 may be made of polymer, metal, or ceramic.

More specifically, the material of which the mesh of the sleeve 1 is made may be aramid fibers or boron fibers. Aramid is a synthetic fiber that has high thermal and mechanical resistance. Boron fiber also has high mechanical resistance. In addition to these characteristics, which are fundamental for the system of the present invention, the aramid polymer materials and the boron fiber present the characteristic of specific low weight.

However, the material to be used in manufacturing the mesh for the sleeve 1 of the casing system for integration of the present invention may be determined as a function of the conditions in which the modular internal intervention equipment is configured to operate. It is noted that the material of which the sleeve is made 1 is not a limiting factor of the scope of the casing system for integration of the present invention.

Figure 3:
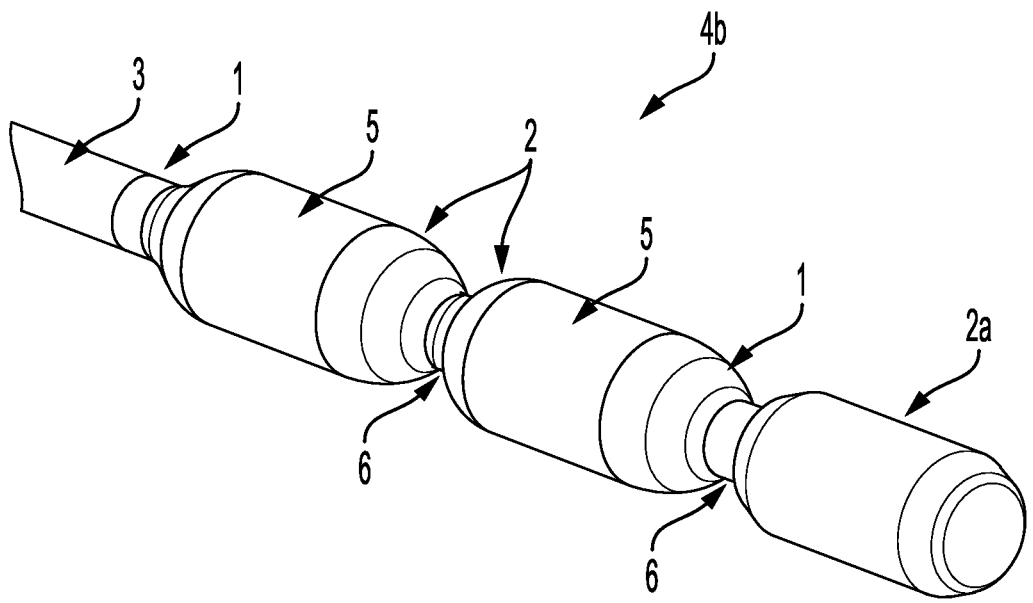
FIG. 3 illustrates the casing system for integration used in modular internal intervention equipment in tubular lines and in part of the umbilical cable, in accordance with another preferred embodiment of the present invention.

FIG. 3 shows a second preferred embodiment of the casing system for integration 4b of the present invention, in which at least one module of the plurality of modules 2 is a tractor module 2a. In this embodiment, the modular equipment further comprises an umbilical cable 3. The umbilical cable 3 is connected to a module 2 located at the rear end of the equipment. The tractor module 2a is located at the front end of the equipment, connected to a module 2 through a communication element 6.

In the casing system for integration 4b of FIG. 3, the sleeve 1 encases, in an integrated matter, two modules 2 and the communication element 6 connected between them, and the communication element 6 connected between the module 2 and the tractor module 2a. One end of the sleeve encases a portion of the tractor module 2a. The other end of the sleeve 1 encases a portion of the umbilical cable 3, which is connected to the module 2 at the back end of the equipment.

The casing system for integration 4b of FIG. 3 allows the modules 2 and their respective communication elements 6 to be integrated safely inside the sleeve 1, eliminating the need to use mechanical connections between the modules 2 and between a module 2 and the tractor module 2a. In that configuration, use of a mechanical interface to connect the umbilical cable 3 to a module 2 of the modular internal intervention equipment is also not necessary. In that situation, the tractive force that would be transferred to the umbilical cable 3 when pulled by the tractor module 2a, is transmitted through the sleeve 1, preventing encumbrance of the modules 2 and of their respective communication elements 6. Similarly, when the umbilical cable 3 is in the process of being retracted, the sleeve 1 transmits the tractive force generated by the tractor module 2a.

Figure 4:
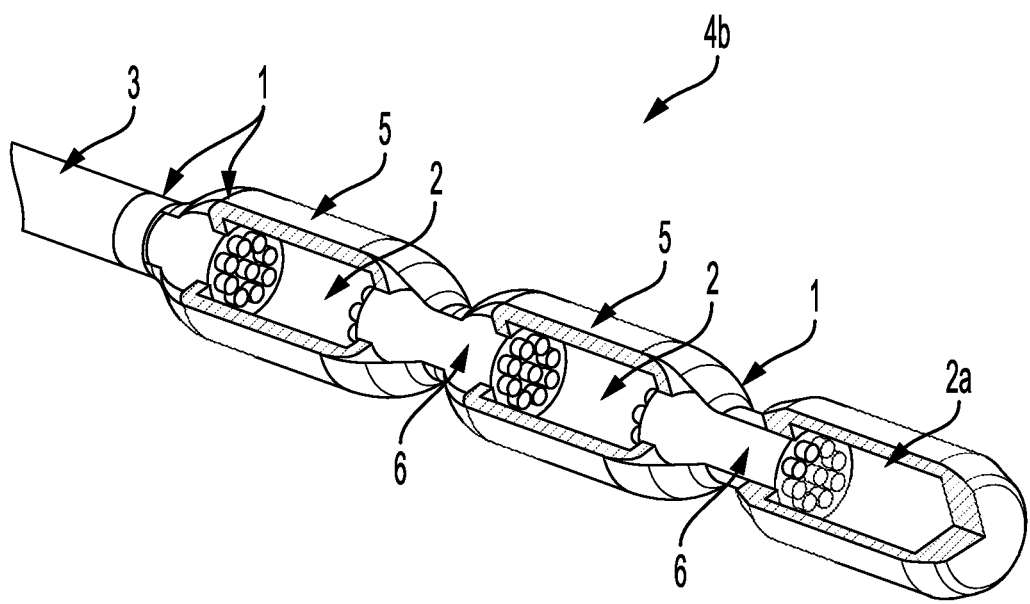
FIG. 4 illustrates a cross-section view of a section of FIG. 3.

FIG. 4 shows a cut-out side view of a section of the modular internal intervention equipment with the casing system for integration 4b applied, as shown in FIG. 3, in which it is possible to see the intercommunication between the modules 2, and between the module 2 and the tractor module 2a, through their respective communication elements 6. It is also possible to see the umbilical cable 3 inserted in the module 2 at the rear end of the equipment.

Figure 5:
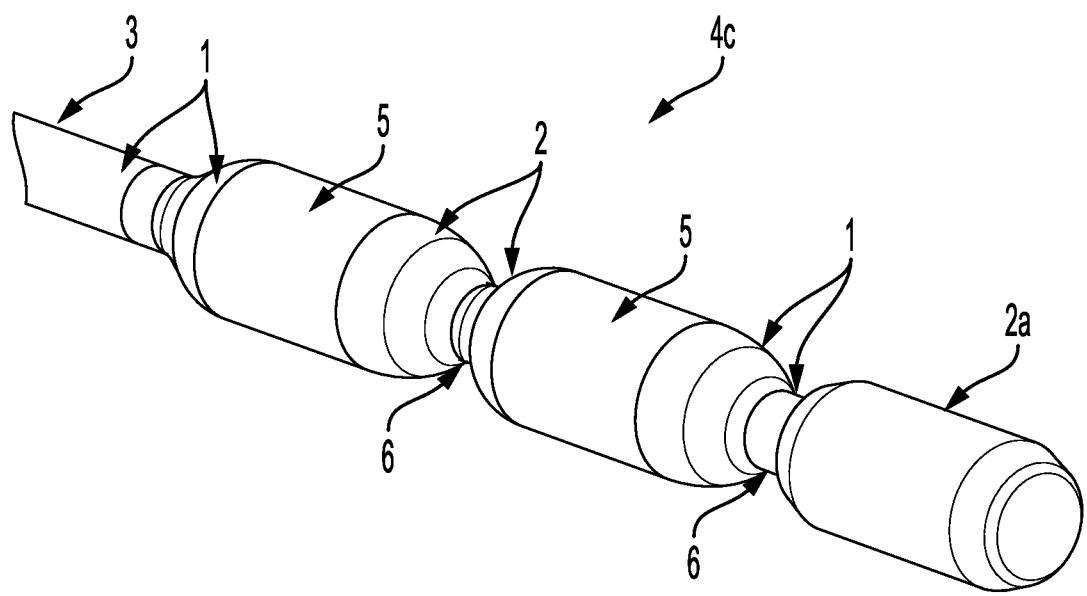
FIG. 5 illustrates the casing system for integration wherein the sleeve is an extension of the casing of the umbilical cable, in accordance with another preferred embodiment of the present invention.

FIG. 5 shows a third preferred embodiment of the casing system for integration 4c of the present invention, wherein the sleeve 1 is constructed as an extension of a casing of the umbilical cable 3, and applied, in an integrated manner, to the modular internal intervention equipment.

The system of the present invention innovatively makes it possible to eliminate the mechanical connections between modules and the mechanical interface between a module and the umbilical cable of a modular internal intervention equipment in tubular lines, such as a robot. The casing system for integration of the present invention guarantees the mechanical integration of all of the modular internal intervention equipment, enabling operation inside the tubular lines to be done more safely, efficiently, and advantageously.

In relation to the gains and improvement obtained from the technical effect attained by the present invention, of eliminating mechanical connections and interfaces, and integrating all of the components of the modular internal intervention equipment, we can list some technical advantages, such as: reduction of the total weight of the modular internal intervention equipment; decreased preventive/corrective maintenance of the modular internal intervention equipment; increased safety in performing internal intervention operations in tubular lines; simplification of the structural design of the components; reduction of the tractive force required by the equipment's engine, due to the decreased weight of the components and due to the elimination of mechanical connections and interfaces; greater flexibility in moving through curves of the tubular line; protection against abrasion, friction and corrosion; transfer of the tractive force to the mesh of the casing system of the present invention, eliminating the encumbrance of the equipment's components; decreasing the risk of rupturing the interconnecting cables between components, and rupturing the umbilical cable, among others.

It is important to point out that the casing system for modular internal intervention equipment in tubular lines of the present invention is sized as a function of the various characteristics of the means of operation of the modular internal intervention equipment, as well as its technical characteristics. Furthermore, the casing system for integration of the present invention may be used in any equipment that is transported inside the tubular lines, in any equipment where its constituting elements may be involved in the casing system of the present invention. Thus, the dimensions and materials of the elements in the system of this invention are not a limiting factor to its scope.

Numerous variations to the scope of protection of this application are allowed. Thus, the fact that the present invention is not limited to the configurations and specific embodiments described above is reinforced.

The invention claimed is:

1. A casing system for integration of modular internal intervention equipment in a tubular line, the casing system comprising:
   a sleeve that encases at least one module of a plurality of modules of the modular internal intervention equipment and at least one portion of at least one upstream component or downstream component to the at least one module of the modular internal intervention equipment; and
   at least one attachment element,
   wherein the at least one attachment element is provided on an outside surface of the sleeve, and
   wherein each of the at least one attachment element is provided in a position such that one attachment element corresponds to one of the plurality of modules.

2. The casing system of claim 1, wherein the sleeve is a mesh of wires or fibers.

3. The casing system of claim 2, wherein the wires or fibers of the mesh that constitutes the sleeve is selected from a group consisting of a polymer, metal, and ceramic.

4. The casing system of claim 2, wherein the wires or fibers of the mesh that constitutes the sleeve is an aramid fiber.

5. The casing system of claim 2, wherein the wires or fibers of the mesh that constitutes the sleeve is made of a boron fiber.

6. The casing system of claim 1, wherein the at least one attachment element is selected from a group consisting of thermo contractile, elastomeric, and thermoplastic material.

7. The casing system of claim 1, wherein the modular internal intervention equipment further comprises at least one communication element connected between two modules of the plurality of modules.

8. The casing system of claim 1, wherein the at least one upstream component is an umbilical cable or a module, and the downstream component is a module.

9. The casing system of claim 8, wherein the umbilical cable comprises a casing and is connected to a module from the plurality of modules, located at a rear end of the modular internal intervention equipment.

10. The casing system of claim 9, wherein the sleeve is an extension of the casing of the umbilical cable.

11. The casing system of claim 1, wherein the at least one module from the plurality of modules is a tractor module.

12. The casing system of claim 11, wherein the tractor module is located at the front end.

13. The casing system of claim 1,
   wherein the modular internal intervention equipment in the tubular lines comprises two modules,
   wherein one of the two modules is a one tractor module and the other of the two modules is an umbilical cable, the umbilical cable is connected to the tractor module at a rear end of the modular internal intervention equipment;
   wherein the sleeve encases the two modules and a communication element connects between the two modules, and
   wherein one end of the sleeve encases a portion of the tractor module; and the other end of the sleeve encases a portion of the umbilical cable.

* * * * *